(12) United States Patent
Pollock et al.

(10) Patent No.: US 11,774,043 B1
(45) Date of Patent: Oct. 3, 2023

(54) METHODS, PRODUCTS, AND SYSTEMS FOR MONITORING AND IMPROVING PIPELINE INFRASTRUCTURE

(71) Applicant: Oceanit Laboratories, Inc., Honolulu, HI (US)

(72) Inventors: Jacob Pollock, Honolulu, HI (US); Ganesh Arumugam, Honolulu, HI (US); Matthew Nakatsuka, Honolulu, HI (US); Vinod Veedu, Houston, TX (US); Glen Nakafuji, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 802 days.

(21) Appl. No.: 16/798,293

(22) Filed: Feb. 21, 2020

Related U.S. Application Data (60) Provisional application No. 62/808,822, filed on Feb. 21, 2019.

(51) Int. Cl.
| | |
|---|---|
| *F17D 5/06* | (2006.01) |
| *F16L 55/04* | (2006.01) |
| *C09D 7/40* | (2018.01) |
| *F16L 58/04* | (2006.01) |
| *F16L 58/10* | (2006.01) |

(Continued)

(52) U.S. Cl.
CPC ............ *F17D 5/06* (2013.01); *C09D 7/40* (2018.01); *F16L 55/041* (2013.01); *F16L 58/04* (2013.01);

(Continued)

(58) Field of Classification Search
CPC . F17D 5/06; F16L 55/041; F16L 58/04; F16L 58/08; F16L 58/1009; F16L 58/14; C09D 7/40

(Continued)

(56) References Cited

U.S. PATENT DOCUMENTS

| | | | | |
|---|---|---|---|---|
| 4,969,381 A | * | 11/1990 | Decker, Jr. ............... | G10D 3/22 84/452 P |
| 5,935,677 A | * | 8/1999 | Pelzer .................... | B60N 3/048 156/196 |

(Continued)

*Primary Examiner* — Minh Q Le
(74) *Attorney, Agent, or Firm* — Fresh IP PLC; Clifford D. Hyra; Aubrey Y Chen (57) ABSTRACT

Methods, products, and systems for monitoring and improving pipeline infrastructure are disclosed. At least one embodiment of the invention comprises a smart-sensing coating, which is applied to one or more interior surfaces of a pipe or pipeline. The coating may comprise a dual-purpose metamaterial, which itself may comprise a plurality of acoustically active and tunable particles that may be embedded in a low-friction, corrosion-resistant, omniphobic polymer matrix. The particles may comprise a multi-layered assembly with a high-density material core, elastic matrix filler, and a stiff outer shell. The particles may further be specifically engineered to form an acoustic band gap at a chosen ultrasound frequency. At this chosen frequency, the particles are very nearly acoustically opaque, preventing the transmission of any and all sound. As such, the position and distribution of the particles inside the pipelines can be clearly distinguished. Additionally, one or more embodiments of the present invention may be referred to as an Intelligent Pipeline System (IPS), which is a monitoring and reporting system for pipelines that uses a remote craft to monitor the interior condition of a pipeline. Preferentially, the IPS uses the smart-sensing coating that is applied to the interior wall of the pipeline to be tested or monitored. Installed acoustic sensors along the pipeline may query the coating and transmit pipeline conditions to the exterior environment where the information can be received by remote craft.

17 Claims, 5 Drawing Sheets

(51) Int. Cl.
*F16L 58/14* (2006.01)
*F16L 58/08* (2006.01)

(52) U.S. Cl.
CPC ............ *F16L 58/08* (2013.01); *F16L 58/1009* (2013.01); *F16L 58/14* (2013.01)

(58) Field of Classification Search
USPC ........... 137/15.06, 236.1, 559; 138/104, 145, 138/146
See application file for complete search history.

(56) References Cited

U.S. PATENT DOCUMENTS

| | | | | |
|---|---|---|---|---|
| 8,000,936 | B2* | 8/2011 | Davis | G01N 17/02 |
| | | | | 73/865.8 |
| 10,190,229 | B1* | 1/2019 | Nakafuji | B05D 5/08 |
| 10,254,424 | B1* | 4/2019 | Pollock | E21B 43/267 |
| 11,105,091 | B1* | 8/2021 | Pollock | B32B 27/065 |
| 2006/0225507 | A1* | 10/2006 | Paulson | G01M 3/243 |
| | | | | 374/4 |
| 2010/0055266 | A1* | 3/2010 | Windhab | A23G 9/20 |
| | | | | 426/317 |
| 2011/0117338 | A1* | 5/2011 | Poquette | C25D 5/54 |
| | | | | 427/244 |
| 2013/0220466 | A1* | 8/2013 | Zandiyeh | G01M 3/38 |
| | | | | 138/104 |
| 2015/0345688 | A1* | 12/2015 | Kersey | B65G 53/523 |
| | | | | 427/230 |
| 2016/0327419 | A1* | 11/2016 | Hellevang | G01F 1/663 |
| 2019/0287509 | A1* | 9/2019 | Kuczynski | G10K 11/168 |
| 2021/0096108 | A1* | 4/2021 | Wang | G01N 29/345 |

\* cited by examiner

METHODS, PRODUCTS, AND SYSTEMS FOR MONITORING AND IMPROVING PIPELINE INFRASTRUCTURE

This application claims the benefit of U.S. Provisional Patent Application No. 62/808,822, filed Feb. 21, 2019, which is hereby incorporated by reference in its entirety.

FIELD OF THE INVENTION

The application relates generally to methods, products, and systems for monitoring and improving pipeline infrastructure, which is usable in a variety of industries, including, but not limited to, the oil and gas industry, public water delivery, and disposal of sewage.

BACKGROUND

Effective maintenance of pipelines is essential in order to move fuel, water, sewage, and other products or liquids long distances. In many instances, such pipelines are essential for transmitting an economic good or potential good, such as fuel, from production or storage facilities to consumers. In the United States, for example, there is a vast network of existing fuel transmission and distribution pipelines that are essential to sustaining ready availability of affordable fuel. Unfortunately, with well over 1 million miles of pipeline needing to be constantly monitored, no economically feasible method of pipeline inspection is commercially available.

Currently, the most straightforward method of pipeline inspection involves in-line-inspection (ILI) tools, such as "pigs" (pipeline inspection gauges), which are inserted into a pipeline or pipeline segment, and then either self-propelled or pushed along the interior of the pipe via applied pressure. "Smart-pigs" may also collect data on the interior pipeline surface based on, for example, magnetic flux leakage (MFL), ultrasound testing (UT), or visual inspection. Although ILI is an established and accepted method of structural health monitoring for pipelines, logistical challenges make it so that pigging is only done infrequently.

Certain older pipelines may suffer from limited access or low/no-flow conditions, making inspection via pigging a potentially risky operation; for example, a pig stuck inside a buried line that requires complete trenching, excavation, and replacement may cost an operator well over U.S. $1 million in lost operational time and labor. As such, under current U.S. law, operators of gas transmission pipelines are only required to perform a re-assessment of pipeline integrity and risk every seven years, even in high consequence areas (HCA) (Public Law 107-355).

Other methods of identifying corrosion and leaks in pipelines similarly have one or more limitations preventing their widespread use. Some newer methods use embedded fiber-optic cable on the exterior of a pipeline to carefully monitor pressure, temperature, or acoustic signals generated by intrusions, defects, or leaks of whatever is transported within the pipeline. However, these methods are typically only applicable to newly installed pipelines, or those with easy physical access to the exterior of the line. Such inspection methods also require the fiber-optic cable or cables to be mounted in a specific array outside of the pipeline, and are further physically vulnerable to damage, with 1 mile of pipe requiring exactly 1 mile worth of fiber-optic cable to inspect.

Finally, some inspection methods use externally generated ultrasound interrogation to determine the health of selected pipelines. Utilizing the acoustic transmission and magnetic properties of typical low-carbon steel, acoustic signals can be effectively transmitted or directly generated within the walls of the pipeline. Some configurations measure acoustic transmission and reflection directly perpendicular to the pipe wall, and, based on time-of-flight differences and frequency changes, can closely determine the location and character of any corrosion-caused structural weakness. Some experimental inspection methods are even claiming the ability to detect the growth and adhesion of deposits such as wax, asphaltene, and sediment, based on changes in ultrasound attenuation. Unfortunately, these transverse configurations are labor intensive, slow, and limited in the inspection of buried pipelines.

Long range ultrasonic testing (LRUT) may potentially obviate the issue of required direct pipeline surface access by propagating low frequency (20-100 kHz) ultrasound within the pipeline walls, in the direction of the pipeline itself. Sound is generated via a probe collar which attaches at a single access point, and will detect general changes in cross-sectional area and discontinuities. However, this method is limited in range to <100 m, as the acoustic impedance change between steel and corroded steel is relatively small.

Therefore, currently available testing methods and systems do not have the ability to remotely monitor the interior conditions of pipes and pipelines without physical connections, such as wires and cables. Further, no currently available testing method or system has been proven to detect deposition or material loss in a pipe or pipeline.

The global market demand for pipeline health monitoring is expected to nearly double over the next decade to over $8 billion, while the need for pipeline coatings and application services is expected to top $11 billion by 2020. Additionally, internal corrosion of pipelines is the cause of up to an estimated 15% of all incidents occurring in oil and gas transmission pipelines, with a cost to the industry of almost $15 billion.

Given the foregoing, there exists a significant need for a new technology capable of allowing for effective, long-range, external, non-invasive monitoring of pipeline integrity. Such new technology must be applicable to existing pipelines with limited physical access, and should show scalability and continuous monitoring capability in order to maximize the collection of actionable information, as well as minimize the time that a potential pipeline leak goes unaddressed.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In general, the present invention is directed to a smart-sensing coating capable of application to the interior of pipelines via batch pigging. The coating may comprise a dual-purpose metamaterial, which itself may comprise a plurality of acoustically active and tunable particles that may be embedded in a low-friction, corrosion-resistant, omniphobic polymer matrix. The low surface energy of the coating results in friction-reducing properties and prevents interaction of corrosive substances and the surface. The particles may comprise a multi-layered assembly with a high-density material core, elastic matrix layer, and (optionally) a stiff outer shell. Here, the outer shell is stiff in comparison to the compliant layer. The particles may further be specifically engineered to form an acoustic band gap at a chosen ultrasound frequency, such as, for instance, between 2 kHz and 250 kHz. At this chosen frequency, the particles are very nearly acoustically opaque, preventing the transmission of any and all sound. As such, the position and distribution of the particles inside the pipelines can be clearly distinguished.

Embodiments of the present invention may also be directed to a LRUT acoustic sensing tool for interrogating the smart-sensing coating. Further embodiments of the present invention may relate to methods for manufacturing and/or processing the coating, as well as methods for collecting and/or interpreting acoustic data generated by the coating during use in pipelines.

The present invention, in one or more of its embodiments, represents an improvement to currently-utilized diagnostic "pigging" technology, which involves inserting and driving a sensor platform through a pipeline. Such current methods for monitoring the condition and integrity of pipeline interiors involve physical probes, and are expensive and cause operational disruptions to the pipeline or pipe segment(s) being monitored or tested.

One or more embodiments of the present invention may be referred to as an Intelligent Pipeline System (IPS), which is a monitoring and reporting system for pipelines that uses a remote craft to monitor the interior condition of a pipeline, including, but not limited to, surface pipelines, buried pipelines, and subsea pipelines. Purely as a non-limiting example, the remote craft may be an unmanned aerial vehicle (UAV) or a remote-operated vehicle (ROV).

Preferentially, the IPS uses a novel surface treatment that is applied to the interior wall of the pipeline to be tested or monitored in order to protect sensors and enable querying of the condition of the pipeline surface. Installed acoustic sources and sensors along the pipeline may query the coating by sending out signals (e.g. at and/or around the band gap frequency, or at/around the band gap frequency and a frequency away from the band gap frequency), and transmit pipeline conditions to the exterior environment where it can be received by the remote craft. For example, the acoustic sensors may broadcast an RF signal continuously or according to a schedule, and a vehicle traveling in the proximity of the sensors when they are transmitting may receive and further transmit and/or store the RF signals to collect the data for processing and analysis. The acoustic sensors used may be similar to known LRUT probe/emission collars mounted externally on the pipeline, with additional connection to external RF, acoustic, or other transmitters.

As a result, one of skill in the art will understand that the IPS does not involve physical intervention to monitor the interior condition of pipelines, which represents an improvement over the currently-available "pigging" technology. Further, the IPS reduces monitoring costs for pipelines and reduces operational disruptions. The novel surface treatment/coating may be applied before or after pipeline construction. The method of acoustic monitoring with relays, plus remote vehicle observation, may also be useful in some embodiments that do not deploy a special coating with acoustically active particles. Issues in the pipelines can be identified at an early stage and scheduled for remediation/repair at a convenient time that minimizes downtime and cost, before major damage or costly failures occur. The IPS may prevent pipeline leaks by catching problems at an early stage, thereby maintaining maximal pipeline uptime, which may be of value to a wide variety of private and public entities, including, but not limited to, oil and gas companies, pipeline operators, and public infrastructure owners and operators.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Generally, the present invention is directed to methods, products, and systems relating to a smart-sensing coating capable of application to the interior of pipelines via batch pigging. The coating may comprise a dual-purpose metamaterial, which itself may comprise a plurality of acoustically active and tunable particles that may be embedded in a low-friction, corrosion-resistant, omniphobic polymer matrix. Other types of matrices may also be used, such as, for example, epoxy, polyurethane, and the like, although it is convenient for the matrix to provide useful properties to the pipeline in addition to providing a structure for the acoustically active particles. The particles may comprise a multi-layered assembly with a high-density material core, elastic matrix filler, and a stiff outer shell. The particles may further be specifically engineered to form an acoustic band gap at a chosen ultrasound frequency. At this chosen frequency, the particles are very nearly acoustically opaque, preventing the transmission of any and all sound, or, alternatively, reduce transmission of sound. As such, the position and distribution of the particles inside the pipelines can be clearly distinguished.

Embodiments of the present invention may also be directed to a LRUT acoustic sensing tool for interrogating the smart-sensing coating. Such a tool can effectively sense coating integrity and material deposition in embodiments of the present invention. Further embodiments of the present invention may relate to methods for manufacturing and/or processing the coating, as well as methods for collecting and/or interpreting acoustic data generated by the coating during use in pipelines.

Additionally, one or more embodiments of the present invention may be referred to as an Intelligent Pipeline System (IPS), which is a monitoring and reporting system for pipelines that uses a remote craft to monitor the interior condition of a pipeline, including, but not limited to, surface pipelines, buried pipelines, and subsea pipelines. Purely as a non-limiting example, the remote craft may be an unmanned aerial vehicle (UAV) or a remote-operated vehicle (ROV).

Preferentially, the IPS uses a novel surface treatment that is applied to the interior wall of the pipeline to be tested or monitored in order to protect sensors and enable querying of the condition of the pipeline surface. Installed acoustic sensors along the pipeline may query the coating and transmit pipeline conditions to the exterior environment where the information can be received by the remote craft.

Figure 1A:
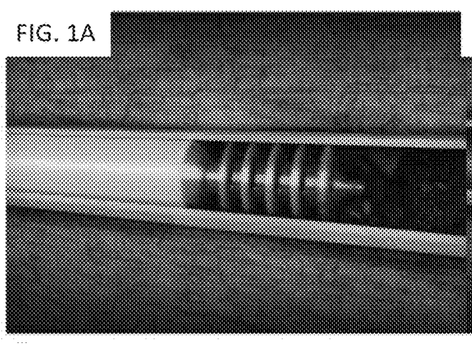
FIGS. 1A-1C illustrate various aspects of a smart-sensing coating, according to an embodiment of the present invention.
Figure 1B:
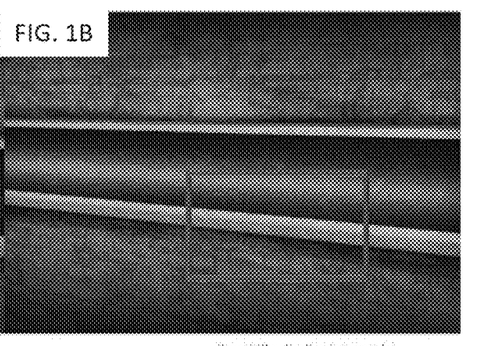
Figure 1C:
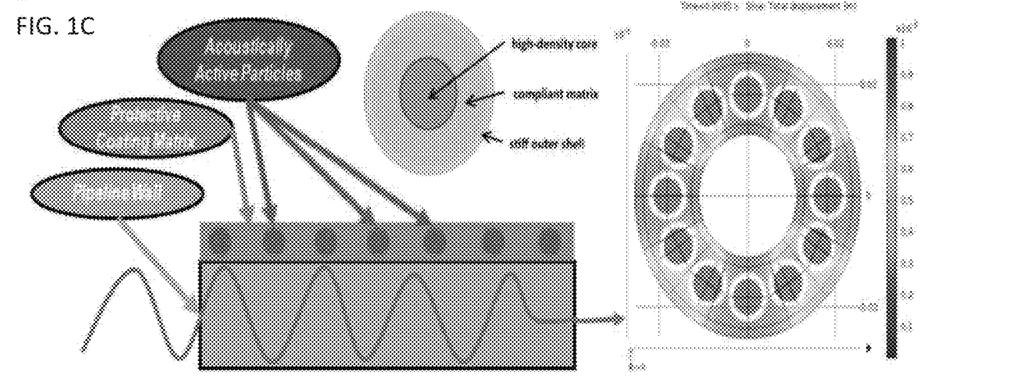

FIG. 1 illustrates various aspects of a smart-sensing coating, according to an embodiment of the present invention. In particular, FIG. 1A shows a smart-sensing coating according to an embodiment of the present invention being applied to one or more interior surfaces 102 of a pipe or pipeline 104 by a dual-purpose cleaning/application pig 106. Application of the coating may be achieved by any suitable means. FIG. 1B shows a pipeline interior 102 after the smart-sensing coating has been applied. The coating provides, among other benefits, corrosion protection and flow assurance properties. The coating comprises a plurality of acoustic dampening particles 108, as illustrated in FIG. 1C. These particles may have near-zero acoustic transmission at a selected frequency, which may be determined by a user at the time of manufacture of the particles. As a result, the particles may be easily detected via long-range ultrasound. Failure to detect the particles, or detection indicating that the particles are in a significantly different position than expected (e.g. further downstream in the pipeline than expected, or leading away from a known location of the pipeline), may indicate coating failure or a pipeline leak. Thus, it should be appreciated that utilizing the smart-sensing coating disclosed herein enables remote detection of pipeline issues. The right side of FIG. 1C shows vibration transmission (displacement) through a section of pipe with novel coating.

The plurality of acoustic dampening particles used in the smart-sensing coating may have specific characteristics, including, but not limited to, an acoustic band gap that is dependent on both the individual materials used to form the particles, as well as any applied stress to the material matrix in which the particles are distributed.

Optimization of geometry, density, and/or distribution of the plurality of particles may be desirable to balance the acoustic responsiveness of the metamaterial with its protective capabilities. Additionally, potential modification of the polymer matrix material, as well as surface functionalization of the particles, may be desirable in order to ensure that the addition of acoustic sensing functionality does not adversely affect already established physical properties of the coating material alone. This may be performed to improve compatibility of the particles with the coating, such as to improve interfacial bond strength.

Figure 2A:
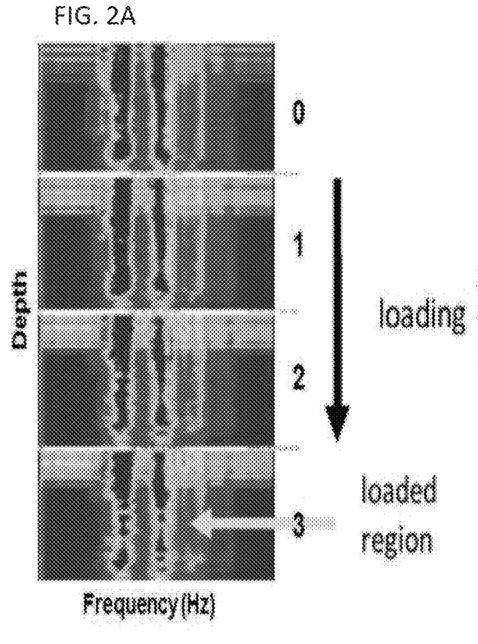
FIGS. 2A-2B illustrate the use of the plurality of acoustic dampening particles for stress sensing, according to a specific embodiment of the present invention.
Figure 2B:
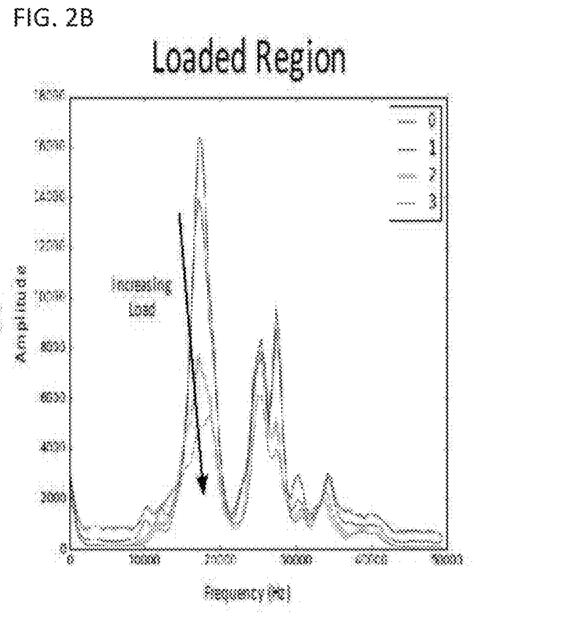
Figure 3A:
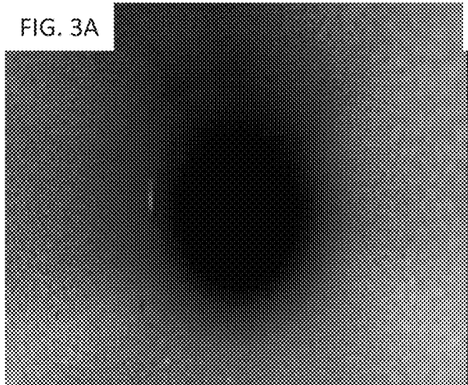
FIGS. 3A-3H illustrate the use of a corrosion-resistant pipeline coating according to one embodiment of the present invention.
Figure 3B:
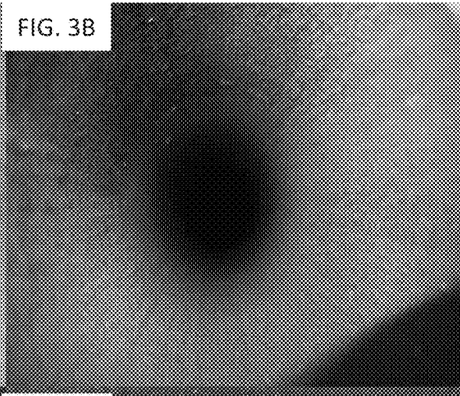
Figure 3C:
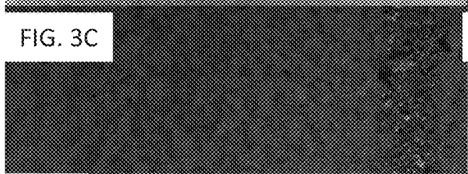
Figure 3D:
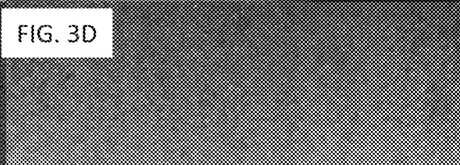
Figure 3E:
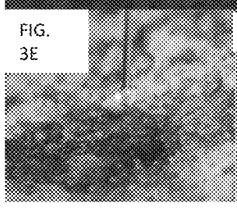
Figure 3F:
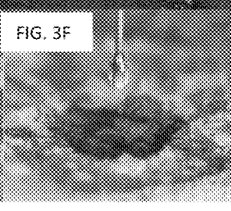
Figure 3G:
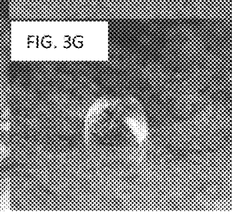
Figure 3H:
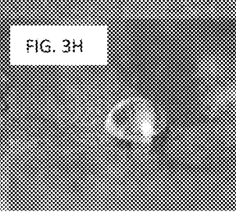

FIG. 2 illustrates the use of the plurality of acoustic dampening particles for stress sensing, according to a specific embodiment of the present invention. FIG. 2A is a series of stress plots of a pipeline having an internal surface encased in a smart-sensing coating, where conditions 0-3 represent increasing applied stress. FIG. 2B is a plot of the amplitude of received signal at two specific frequency peaks, showing a decrease in signal with increased load. In the embodiment illustrated in FIG. 2, the particles were distributed into wellbore coating, showing that acoustic dampening and acoustic absorption at a characteristic frequency peak decreased in a repeatable fashion under increasing stress when interrogated with an ultrasonic imaging tool. The overall proportion of the particles in the coating may be extremely low, typically less than 1%. It should be appreciated that such a small percentage does not materially change the properties of the coating matrix and adds only minimal cost.

Further embodiments of the invention may also comprise water- and oil-repellent coatings capable of in-situ application to the interior of a pipeline, including, but not limited to, a pipeline that may already be in service and/or a pipeline that may have been previously corroded. One such corrosion resistant coating substantially reduces the adhesion force between the underlying steel substrate in a pipeline and accumulated deposits, such as scale and hydrates. The coating also reduces surface roughness of the pipeline by roughly 100-fold, directly reducing pressure drop within the pipeline due to friction-related losses. The coating is a water-based formulation with no VOCs or HAP content, thereby making the coating readily compatible with typical acoustic particle shell materials. Additionally, the coating is capable of superior erosion and abrasion resistance, even when applied directly onto a previously corroded surface, and even at an extremely thin (<100 μm) applied thickness.

FIG. 3 illustrates the use of the drag and corrosion reducing coating, according to one embodiment of the present invention. FIG. 3A illustrates a worn and corroded pipeline prior to coating, while FIG. 3B illustrates the same worn and corroded pipeline after application of the coating using an applicator PIG. FIG. 3C is an image of the pipeline interior surface prior to coating, where the surface roughness is roughly 4000 μinch. By contrast, FIG. 3D is an image of the same pipeline interior surface after coating, exhibiting a surface roughness of only roughly 40 μinch. FIG. 3E shows the spreading of water molecules on a surface that is uncoated, and FIG. 3F shows the spreading of oil on a likewise uncoated surface. FIG. 3G illustrates a post-coating surface exhibiting hydrophobic properties, while FIG. 3H illustrates a post-coating surface exhibiting oleophobic properties.

Embodiments of the present invention comprise cost-effective and scalable technologies to monitor and improve pipeline infrastructure. Such technologies would be of extreme benefit to various public and private owners and users of pipelines, including, but not limited to, oil and gas producers, pipeline operators, the communities through which the pipelines travel, and every major consumer of natural gas and refined petroleum. Embodiments of the present invention are unique in that they offer both improved safety and direct economic value by protecting pipeline interiors from corrosion and deposition, thereby allowing for more efficient pipeline transport and reduced pressure loss due to friction. It should be appreciated that utilizing embodiments of the present invention obviate the need for balancing between ensuring that a pipeline is operating safely and burdening pipeline operators with overly restrictive and costly regulations.

The smart-sensing coating that is at least one embodiment of the present invention further allows for optimization of pipeline use and scheduled maintenance, thereby enabling less pipeline downtime and less unnecessary cleaning and replacement of pipelines. Adaptation of the coating would also significantly benefit the public, since fewer major pipeline leaks and blowouts would occur. The coating further represents a much smaller expense than full replacement of a pipeline or installation of fiber optic monitoring or sensing systems, thereby enabling fast and widespread adoption, even by public entities, such as utilities, whose budgets are constrained by law or by appropriations. The coating also allows smaller leaks, which often go unrepaired and undetected for months or even years under currently available technology, to be easily pinpointed and addressed. It should be appreciated that all of the anticipated cost savings realized by pipeline operators and utilities that use the coating may ultimately be passed down to the end consumer via lower rates.

At least one embodiment of the present invention comprises methods for producing and/or formulating a smart-sensing coating. The coating may comprise a plurality of acoustic dampening particles suspended in a protective coating matrix. The particles may comprise cores comprising one or more core materials, which may be one or more ceramics, metals, and/or polymers, in hollow-core and/or solid configurations. An automated pan or fluidized bed coating process may be used to apply uniform layers of different materials of varying densities to the cores in order to create the particles with multilayered structures of one or more specific densities, geometries, and/or mechanical properties (such as compounding). The coating process may be a process previously used for, among other methods, developing evenly-coated proppant sand particles. It should be appreciated that the one or more specific densities, geometries, and/or mechanical properties may be chosen in order to produce a local resonance effect. Such effect appears in the acoustic spectrum as a band gap at a particular frequency range, which may be selected based on user preference. This effect may be used to determine both whether the coating with acoustically active particles is in place and intact, if material has deposited on the coating, and to determine whether the coating is under stress.

Figure 4:
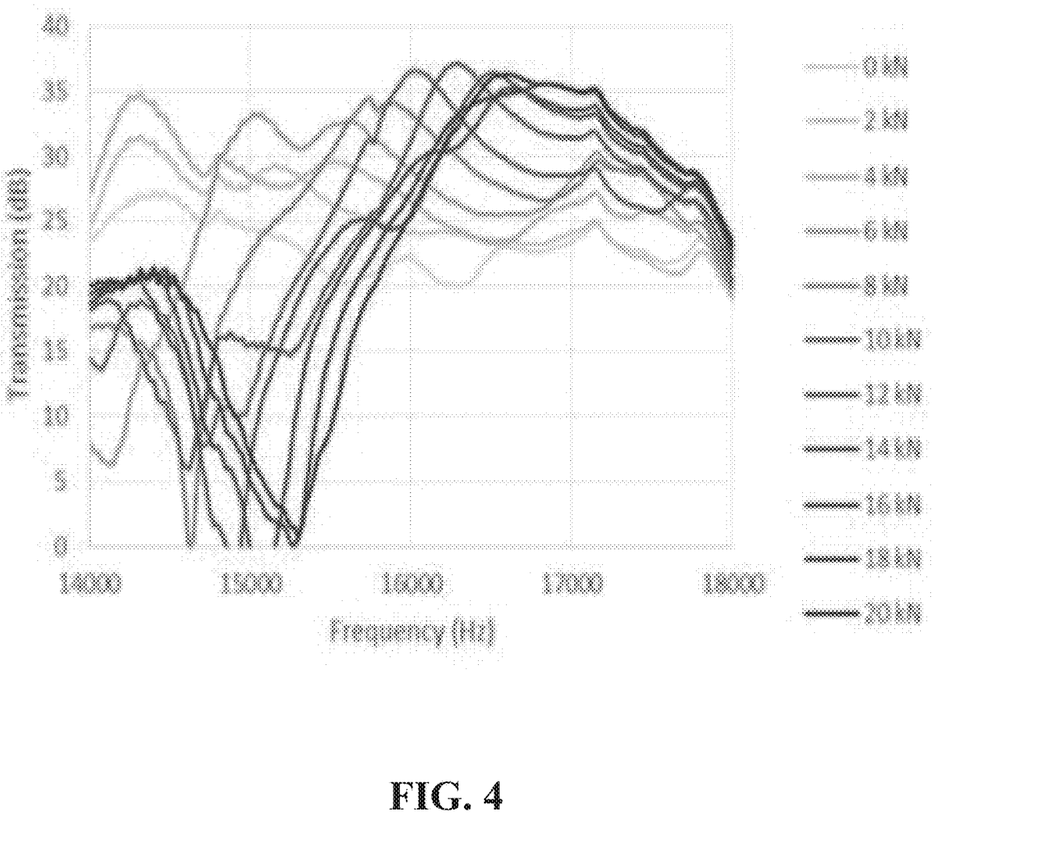
FIG. 4 illustrates a shift in acoustic behavior and band gap peak of a plurality of acoustic dampening with application of physical stress.

As shown in FIG. 4, application of physical stress to the plurality of acoustic dampening particles results in a substantial shift in acoustic behavior and band gap peak of the particles. Measurement of the effects of mechanical stress may be achieved by one or more testing methods well-known to one of skill in the art, including, but not limited to, known transverse LRUT methods.

Acoustic sensors may acoustically interrogate pipeline interiors believed to be coated with the dual-purpose metamaterial coating comprising acoustically active particles tuned to demonstrate an acoustic band gap at a chosen ultrasound frequency. The response may be analyzed to determine whether band-gap performance is indeed detected at the chosen frequency. Absence of such band-gap performance may indicate damage to the coating, and the pipeline surface, and/or accumulation and adhesion of deposits on top of the protective coating. Alteration of the band-gap performance from expected performance may indicate a pipeline leak causing local changes in applied pressure, which in turn affects band-gap performance of the coating. That is, pressure changes resulting from a pipeline leak result in a shift in the acoustic band gap of the particles. Thus, acoustic interrogation of a coating comprising acoustically active particles tuned to exhibit band-gap performance at a chosen frequency can be used to determine integrity and adhesion of the coating to the pipeline surface over time, leaks in the pipeline, defects in the underlying pipe substrate, such as formation of corrosion pitting and stress cracking, and accumulation and adhesion of deposits on top of or under the protective coating. These issues result in different effects on sound transmission amplitude at different frequencies, thereby enabling effective interrogation.

One of skill in the art will appreciate that uniform production of evenly-coated acoustic dampening particles may be necessary for the smart-sensing coating. As a result, in at least one embodiment of the present invention, the density, size, and/or shape distribution of the particles is assayed. Additionally, various properties of the smart-sensing coating may be tested and verified prior to use, including, but not limited to, viscosity, curing time, wetting behavior, wet/dry-film thickness, and number of coats required to achieve a functional layer.

Figure 5:
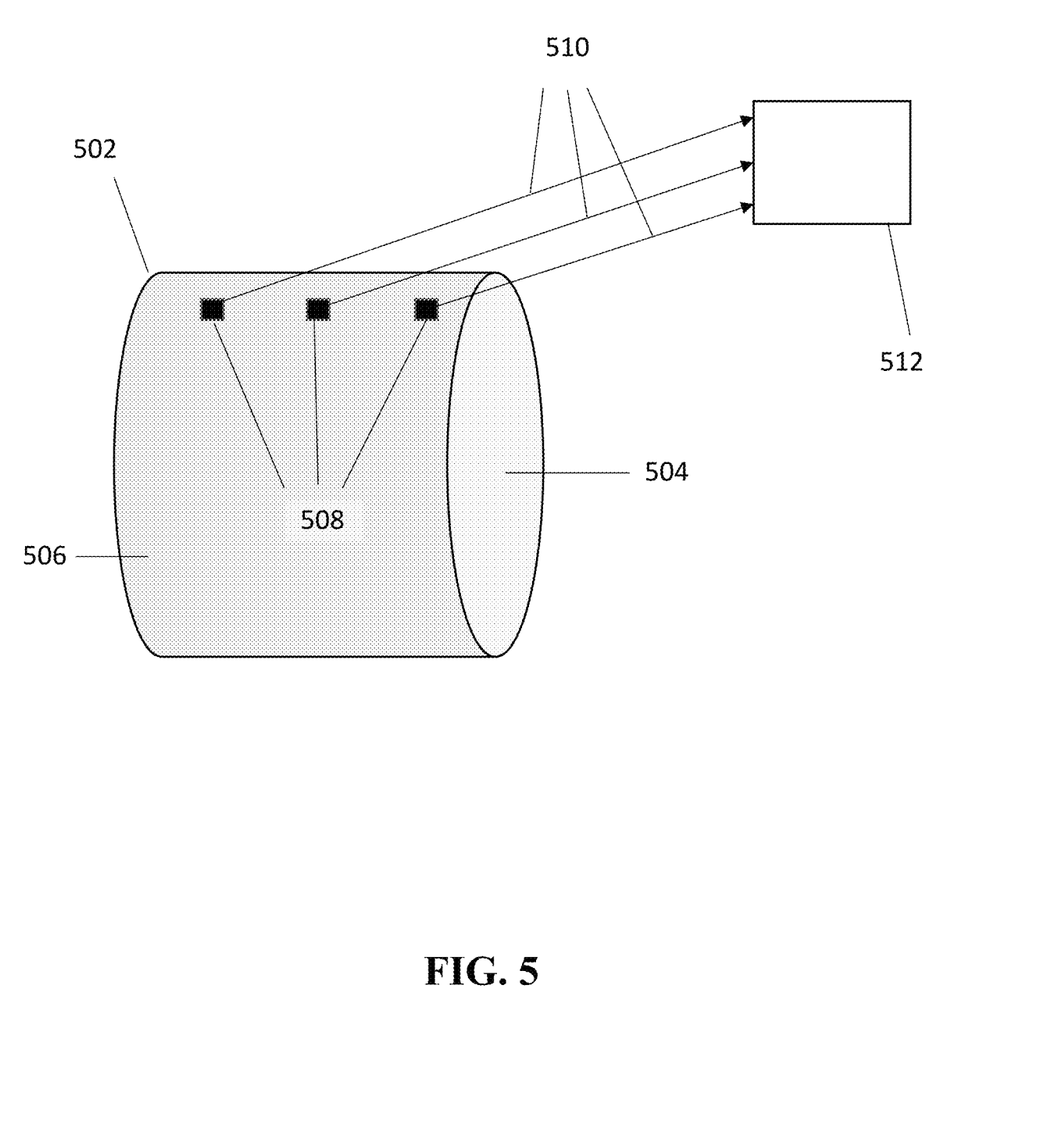
FIG. 5 is a schematic illustration of portions of an Intelligent Pipeline System (IPS), according to an embodiment of the present invention.

Turning now to FIG. 5, a schematic illustration of portions of the IPS, according to an embodiment of the invention, are displayed. A skilled artisan will appreciate that the portions of the IPS illustrated are not to scale, and are illustrated for diagrammatic purposes. FIG. 5 displays a section of a pipe or pipeline 502, with an interior 504 on which the novel surface treatment described herein is applied. The section of a pipe or pipeline 502 may be a portion of any pipe or pipeline, including, but not limited to, surface pipes or pipelines, buried pipes or pipelines, and subsea pipes or pipelines.

On the exterior surface 506 of the pipe or pipeline, acoustic sensors 508 are installed that enable querying of the condition of coating of the interior of the pipe or pipeline. These sensors may transmit signals 510 to a remote craft 512 that receives the signals and stores and/or processes them for further analysis as to the condition of the pipe or pipeline.

These and other objectives and features of the invention are apparent in the disclosure, which includes the above and ongoing written specification.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

We claim:

1. A system for monitoring and reporting interior conditions in a pipeline, the system comprising:
    a coating applied to an interior surface of a pipeline, wherein the coating comprises acoustic dampening particles embedded in a matrix;
    one or more acoustic sensors on the pipeline, wherein the acoustic sensors are configured to broadcast signals, and
    a remote craft configured to receive the signals from the acoustic sensors,
    wherein the acoustic sensors are configured to query the coating and to transmit data on conditions of the interior surface of the pipeline to the remote craft, and
    wherein the remote craft stores the signals.

2. The system of claim 1, wherein each of the acoustic dampening particles comprises a multi-layered assembly, the multi-layered assembly comprising a high-density material core, elastic material filler, and a stiff outer shell.

3. The system of claim 1, wherein the acoustic dampening particles are engineered to form an acoustic band gap at a pre-determined ultrasound frequency.

4. The system of claim 3, wherein, at the pre-determined ultrasound frequency, the plurality of acoustic dampening particles is acoustically opaque, thereby preventing transmission of sound.

5. The system of claim 2, wherein the high-density material core comprises one or more core materials.

6. The system of claim 5, wherein the one or more core materials are selected from the group consisting of one or more ceramics, one or more metals, one or more polymers, and combinations thereof.

7. The system of claim 1, wherein the matrix is low-friction and corrosion-resistant.

8. The system of claim 1, wherein the matrix is an epoxy coating.

9. The system of claim 1, wherein the pipeline is selected from the group consisting of a surface pipeline, a buried pipeline, and a subsea pipeline.

10. The system of claim 1, wherein the acoustic sensors are mounted externally on the pipeline.

11. The system of claim 1, wherein the RF signals are broadcast either continuously or according to a pre-determined schedule.

12. A system for monitoring and reporting interior conditions in a pipeline, the system comprising:
    a smart-sensing coating applied to an interior surface of a pipeline, wherein the smart-sensing coating comprises a metamaterial comprising acoustic dampening particles embedded in an omniphobic polymer matrix;
    one or more acoustic sensors installed on the pipeline, wherein the acoustic sensors are configured to broadcast radio frequency (RF) signals; and
    a remote craft configured to receive the RF signals from the acoustic sensors,
    wherein the acoustic sensors are configured to query the smart-sensing coating and to transmit data on conditions of the interior surface of the pipeline to the remote craft, and
    wherein the remote craft stores the RF signals for data processing and data analysis.

13. The system of claim 12, wherein the remote craft operates on land, sea, and/or air, and is manned, unmanned, autonomous, and/or remote-controlled.

14. The system of claim 12, wherein the remote craft transmits the RF signals to a user.

15. A method for remotely monitoring an interior surface of a pipeline, the method comprising:
    applying a smart-sensing coating to an interior surface of a pipeline, the smart-sensing coating comprising acoustic dampening particles engineered to form an acoustic band gap at a pre-determined ultrasound frequency;
    attaching one or more acoustic sensors on the pipeline;
    interrogating the smart-sensing coating by broadcasting signals at the pre-determined ultrasound frequency;
    determining distribution of the acoustic dampening particles inside the pipeline, thereby determining conditions of the interior surface of the pipeline;
    utilizing the acoustic sensors to transmit the conditions of the interior surface of the pipeline to an exterior environment;
    piloting a remote craft in the exterior environment; and
    using the remote craft to receive the conditions of the interior surface of the pipeline.

16. The method of claim 15, wherein the acoustic sensors transmit the conditions of the interior surface of the pipeline to the exterior environment either continuously or based on a pre-determined schedule.

17. The method of claim 15, wherein the acoustic sensors are attached on an external surface of the pipeline.

* * * * *